April 22, 1952  E. C. BOSTOCK  2,593,967
LUBRICATED PLUG VALVE
Filed Oct. 1, 1945  2 SHEETS—SHEET 2

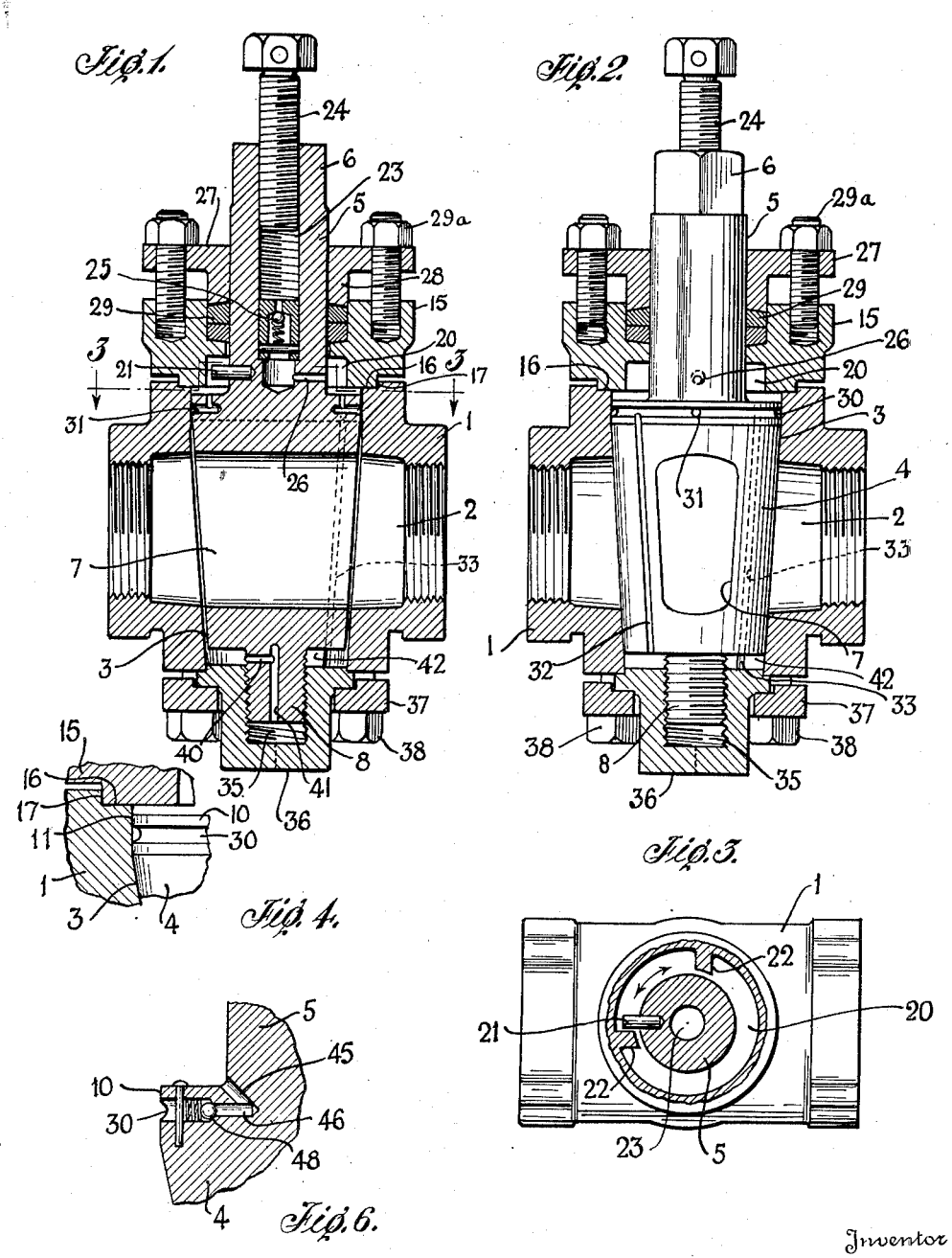

Inventor
EDWARD C. BOSTOCK

Patented Apr. 22, 1952

2,593,967

UNITED STATES PATENT OFFICE 2,593,967

LUBRICATED PLUG VALVE

Edward C. Bostock, Bryn Athen, Pa., assignor to The Pitcairn Company, Wilmington, Del., a corporation of Delaware Application October 1, 1945, Serial No. 619,578

6 Claims. (Cl. 251—93)

The present invention relates to new and useful improvements in lubricated plug valves, and particularly to valves of this type in which a charge of the lubricant is forcibly ejected between the seating surfaces of the valve body and plug when the plug is turned either to open or close the valve.

A further object of the invention is to devise a valve in which the plug will be lifted from its seat during the opening movement and drawn down upon its seat during the closing movement, in combination with the provision for ejecting the lubricant on to the seating surfaces during the movement of the plug. The raising of the plug tends to free it from the valve body and while the plug is moving the lubricant is ejected on to the seating surfaces. This makes a more easily operated valve and is especially valuable when the valve is frozen by corrosion by the line fluid or long periods of non-use. The drawing down of the plug to its seat on closing assures a leak-proof valve.

The space between the plug and valve body when the valve is opened can be regulated to any extent which may be desirable by determining the degree to which the plug is raised during opening or by the pitch of the taper between the valve body and the plug, or both.

A further feature of the construction shown and described herein is that the lubricant is positively circulated over the valve seating surfaces during the opening and closing movements, so that the entire seating surfaces are lubricated and any foreign matter between the surfaces will tend to be cleared out.

Other advantages will be apparent from the following detailed description of the preferred forms of the invention, it being understood that changes and modifications may be made without departing from the principles of the invention as set forth in the appended claims.

In the drawings in which the best known forms of the invention are illustrated:

Fig. 1 is a cross section through a typical valve which provides for the full circulation of the lubricant over the seating surfaces during the opening and closing movements. In this view the valve is shown in its fully opened position.

Fig. 2 is a similar view, the valve being closed.

Fig. 3 is a section on the line 3—3 of Fig. 1.

Fig. 4 is an enlarged detail at the upper end of the plug showing the formation of the plug and the valve body at this point.

Fig. 6 is a detail view showing a modification of the lubricant feeding passage in the plug whereby a fresh charge of lubricant is ejected from the main lubricant reservoir on each opening movement of the valve.

Figure 5:
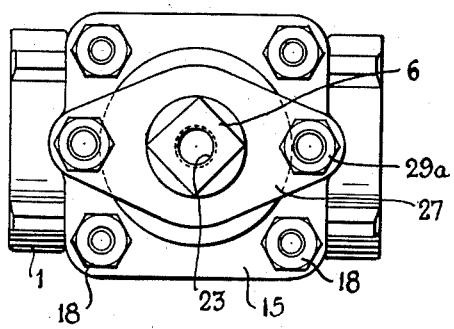
Fig. 5 is a plan view of the valve.

As indicated above, the valve of the present invention is characterized by the provision of means to force lubricant on to the valve seating surfaces when the valve is operated. This action is accomplished by a raising and lowering of the plug. In order to accomplish the purposes set forth, two lubricant chambers are provided, one at each end of the plug, and the plug is designed with two piston-like formations which reciprocate in the chambers to eject the lubricant therefrom into channels provided on the seating surfaces.

Referring to Figs. 1 to 5 inclusive, the valve body is indicated at 1. This body may be of any standard form and is provided with a through passage 2 for the line fluid. In the center of the body is located the vertical passage or valve seat indicated at 3. In order to achieve the main objects of the invention, the seat is tapered, although it may be cylindrical if it is found desirable. In this seat is located the rotatable plug, the main body or central portion 4 of which is shaped to fit the seat in the valve body. The taper of the plug and valve seat may be of any degree depending upon the service to which the valve is to be subjected, and the extent of the space is to be provided at the seat when the valve is opened.

The upper end of the plug is provided with an elongated stem 5 which projects outwardly of the valve body and is provided with means by which the plug may be rotated, here indicated as the usual squared portion 6. The body portion of the plug is provided with the passage 7 which registers with the through passage 2 when the valve is open. The lower end of the plug has a threaded extension 8 which, as will be described, acts to raise and lower the plug as it is rotated. This extension also acts as one of the lubricant forcing pistons.

At the upper end of the enlarged portion of the plug the contour changes from a taper to a cylinder, and the seating surface of the valve body is similarly changed to a cylindrical surface. This is shown more clearly in Fig. 4 where the cylindrical surface on the plug is indicated by the numeral 10 and the corresponding cylindrical surface on the valve body by the numeral 11. The cooperating cylindrical formations just described constitute the second lubricant forcing piston referred to above.

The upper end of the valve body is closed by a bonnet 15 which is annular and is formed with a rib 16 which fits within an angular recess or rabbet 17 formed on the top of the valve body. The bonnet 15 is held against the top of the valve body by bolts 18 located at the corners of the bonnet and threaded into the valve body so as to make a tight seal about the upper end of the body.

It will be noted that the upper end of the plug is somewhat below the seat for the bonnet and that the under surface of the bonnet is recessed and the space thus formed above the upper end of the plug body constitutes the main lubricant reservoir indicated by the numeral 20.

The valve is restricted to a movement of 90°, by any suitable means. As shown in Figs. 1 and 3, this is a pin 21 projecting from the base of the valve stem and movable between two abutments 22 carried by the bonnet.

The lubricant usually employed in valves of this type is a plastic which is ordinarily supplied in the form of sticks. The axis of the valve stem 6 is formed with a long passage 23, the interior of which is screw-threaded for a sufficient distance and in the screw-threaded bore is located the usual lubricant feeding pin 24. The passage 23 and the pin 24 constitute the means for supplying the valve with the lubricant. Near the bottom of the passage is located a check valve 25 which permits the inward movement of lubricant from the passage 23 but prevents any return thereof.

Below the check valve there is located a transverse passage 26 which conducts the lubricant from the lower end of the passage 23 to the main lubricant reservoir 20.

Over the bonnet 15 is the gland 27 which fits the cylindrical portion of the stem and is provided with a rib 28 having a close fit with a recess in the top of the bonnet. A packing 29 is located in the recess and is firmly compacted between the gland and the bonnet by the bolts 29ª which are threaded in the bonnet.

In the cylindrical or upper piston portion of the plug there is provided a circular groove 30 which is filled with lubricant from the reservoir 20 by the angular passages 31 shown in Fig. 1, which open from the top of the main plug body. Leading from the groove 30 to the lower end of the main body of the plug are two oppositely positioned lubricating channels or grooves 32, and if desired, two longitudinal oppositely positioned grooves or channels 33 are formed in the seating portion of the valve body. One of these latter channels is shown in Fig. 1. The channels 32 and 33 are located so that they are in register when the valve is closed. It will be noted that the grooves 32 are located adjacent to one side of the through passage 7 in the plug so that they wipe about the seating surface of the body but are never in register with the opening 2 and are not exposed to the direct action of the line fluid.

Referring now to the lower portion of the valve. The threaded extension 8 engages the threaded recess 35 in a cap 36 which fits within the lower end of the valve seat. The cap is held tightly against the lower surface of the valve body by a clamping ring 37 and bolts 38 threaded into the valve body.

The portion of the cap 36 which projects below the ring 37 is preferably squared so as to provide means for adjusting the cap to regulate the fit between the tapered portions of the plug and body. This not only provides means for vertically adjusting the plug, without rotating it, and may thus be used for taking up wear and assuring a tight initial fit between the plug and the body when the valve is closed, but also serves as a means for breaking any excessive adhesion between the plug and the body. When the cap has been adjusted to its proper position it is held by tightening the bolts 38.

It will be noted that the lower end of the plug is spaced somewhat from the adjacent surface of the cap and that the lower end of the threaded extension 8 is also spaced from the bottom of the screw-threaded recess 35 in the cap. At the top of the extension 8, a transverse passage 40 and an axial passage 41 in the extension provide a channel which connects these two spaces. The spaces which are indicated by the numerals 35 and 42 respectively, together constitute a secondary lubricant reservoir and receive lubricant from the channels 32 and 33.

The operation of the embodiment of the invention which has been described is as follows:

Assuming the valve to be closed as in Fig. 2 and the reservoirs 20 and 35—42 filled with lubricant, the rotation of the plug, through the screw-threaded connection between the extension 8 and the cap 36, will raise the plug as the valve is opened. This action will open up the space between the surfaces 3 and 4 to the extent which is desired. The opening is clearly shown in Fig. 1, the showing being somewhat exaggerated over usual practices in order to illustrate the operation of the valve. The actual space provided between the seating surfaces may be adjusted to any degree desired by altering the pitch of the thread or by altering the degree of taper. In certain types of valves and for certain services it may be desirable to provide for only a few thousandths of an inch clearance between the face of the plug and the seat on the body. This may be closely calculated in designing valves for a great variety of uses.

As the plug rises, the cylindrical extension 10 acting as a piston in its movement through the cylindrical portion 11 of the body, forces lubricant from the main lubricant reservoir 20 into the groove 30 and through the passages 32 and 33 over the seating surfaces of the valve, the excess finding its way into the lower or secondary reservoirs 35—42. As the valve is closed and descends, the piston-like extension 8 and the lower surface of the plug body act as pistons and force the lubricant from these reservoirs back through the channels 32—33 into the main reservoir.

It will be noted that the effective piston area of the upper portion of the plug is, and should be, somewhat greater than the effective piston area at the lower end of the plug, because the space between the seating surfaces of the plug and valve is increasing while the plug is rising and there is therefore greater demand for lubricant at this time in order to seal the space about the plug. On return or closing movement this space is diminished and the lubricant entrapped between the surfaces 3 and 4 will return to the reservoir 20 together with the lubricant ejected from the reservoirs 35 and 42.

It will thus be seen that there is an effective forced flow of lubricant in opposite directions over the valve surfaces while the valve is opened and closed. This action not only serves to lubricate the surfaces thoroughly but also tends to remove any foreign particles which may find their way between the surfaces 3 and 4. Any lubricant which may be ejected into the main fluid passage can be replaced by turning down the feed pin 24 at intervals.

It will be understood that in the foregoing and throughout the specification and claims the terms "upper" and "lower" as they are used to describe the location of various parts of the valves are used merely for convenience in describing the relative positions of various parts of the device and are not to be construed as limiting the invention to the upright position of the valve which has been selected for illustrating the invention.

In valves for certain uses it is sometimes desirable to provide for a fresh charge of lubricant on each opening movement of the valve, and to scavenge the seating surfaces with each closing movement. This is particularly true where the main-line fluid carries an excessive amount of sediment which would be trapped between the valve seating surfaces.

In order to adapt the improved valve for this type of work the modification shown in Fig. 6 has been devised. In this view the same numerals are applied to like parts. Instead of the passage 31 which leads to the groove 30 in the top or cylindrical portion of the plug, the lubricant from the chamber 20 passes first through an oblique passage 45 into the radial passage 46 and thence to the groove 30. In the passage 46 is located the check valve 48 which may be a spring actuated ball valve, or the spring may be omitted. In the operation of this modification of the valve, a fresh charge of lubricant is forced out of the reservoir 20, into the groove 30 and onto the valve seating surfaces each time the valve is opened. On closing movement no lubricant can pass back into the main reservoir 20, but all of the lubricant between the surfaces 3 and 4 and any lubricant from the lower reservoirs is squeezed out into the main-line passage and is carried away by the main-line fluid. This action thoroughly scavenges the seating surfaces at each closing operation of the valve.

Figure 7:
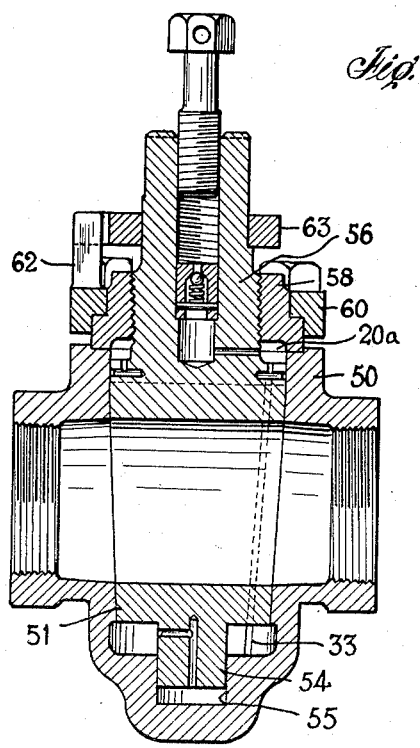
Fig. 7 is a section through a modified form of valve embodying the invention.
Figure 8:
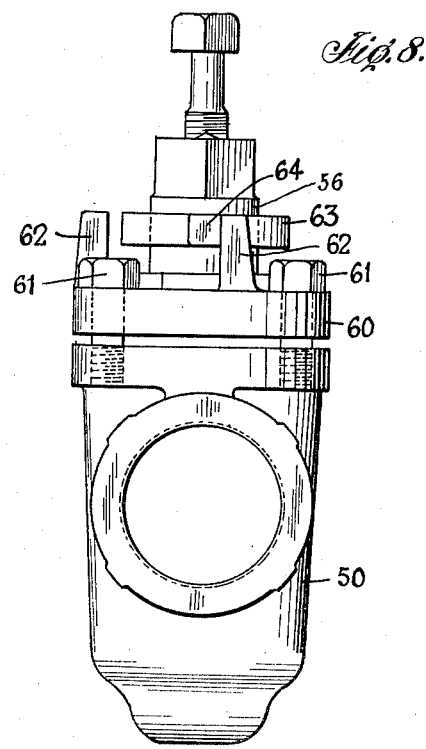
Fig. 8 is a side elevation thereof.

A further modification which has as its principal object the omission of the packing about the valve stem is shown in Figs. 7 and 8.

In this form of the invention which embodies the basic features of the earlier described form, the valve body is shown at 50 and the rotatable plug at 51. The shape of the main or body portion of the plug and the seating surface on the valve body and the location of the lubricant channels are the same as in the previously described embodiments.

In this form of the invention the lower axial extension on the plug is smooth as shown at 54 and fits within a smooth recess 55 to form the piston for the lowermost lubricant reservoir. The raising and lowering of the plug is accomplished by providing the exterior of the valve stem 56 above the plug with screw threads which engage a screw-threaded bore within a bonnet 58 which closes the upper end of the valve body. The bonnet is rotatable on the valve body to secure the preliminary adjustment of the plug or to take up wear in the valve and is firmly clamped in its adjusted position by the clamping ring 60 and the series of bolts 61 which are threaded into the valve body.

To limit the movement of the valve to 90° the ring 60 is provided with two upstanding lugs 62 and a collar 63 having a finger 64 is fixed to the valve stem 56 and moves between the lugs 62.

The valve stem is provided with the axial lubricant feed passage, feed screw, check valve and channel leading to the main lubricant reservoir 20ª as in the prior form of the invention.

The operation of this form of the invention is the same as in the earlier form, but the design is simpler and the necessity of providing a stuffing box and packing gland is eliminated.

The foregoing description has been quite detailed in order to explain the principles of the invention, but the description and drawings are not to be taken as limiting the invention to those forms. Having described the invention in its best known and preferred forms, what is sought to be covered and claimed herein, follows.

What is claimed is:

1. In a lubricated valve, a valve body having a main-line passage therethrough and a valve seat intercepting the main-line passage, said valve seat being tapered throughout its major portion but provided with a cylindrical extension at one end thereof, a rotatable plug located in the seat and having its major portion tapered to fit the major portion of the valve seat and having a cylindrical extension to fit the cylindrical extension on the valve seat, a lubricant reservoir above the extension, lubricant passages in the contacting surfaces of the plug and valve body and in connection with the reservoir, and means to raise and lower the plug during rotation.

2. In a lubricated valve, a valve body having a main-line passage therethrough and a valve seat intercepting the main-line passage, said valve seat being tapered throughout its major portion but provided with a cylindrical extension at one end thereof, a rotatable plug located in the seat and having its major portion tapered to fit the major portion of the valve seat and having a cylindrical extension to fit the cylindrical extension on the valve seat, a lubricant reservoir above the extension, lubricant passages in the contacting surfaces of the plug and valve body and in connection with the reservoir, and a screw-threaded formation on the plug adapted to raise and lower the plug during rotation.

3. In a lubricated plug valve, a valve body having a main-line passage therethrough and a valve seat intercepting the main-line passage, said valve seat being tapered throughout its major portion but provided with a cylindrical extension at one end thereof, a rotatable plug having a body located in the seat and having its major portion tapered to fit the major portion of the valve seat and having a cylindrical piston at one end to fit the cylindrical portion of the valve seat, a piston like extension on the other end of the plug, lubricant reservoirs at the ends of the plug body with which said pistons cooperate, and means to raise and lower the plug during rotation.

4. In a lubricated plug valve, a valve body having a main-line passage therethrough and a valve seat intercepting the main-line passage, said valve seat being tapered throughout its major portion but provided with a cylindrical extension at one end thereof, a rotatable plug having a body located in the seat and having its major portion tapered to fit the major portion of the valve seat and having a cylindrical piston at one end to fit the cylindrical portion of the valve seat, a piston-like extension on the other end of the plug, lubricant reservoirs at the ends of the plug body with which said pistons cooperate to exert pressure on the lubricant, and a screw-threaded connection between the plug and the valve body.

5. In a lubricated plug valve, a valve body having a main-line passage therethrough and a valve seat intercepting the main-line passage, said valve seat being tapered throughout its major portion but provided with a cylindrical extension at one end thereof, a rotatable plug having a body located in the seat and having its major portion tapered to fit the major portion of the valve seat and having a cylindrical piston at one end to fit the cylindrical portion of the valve seat, a piston-like extension on the other end of the plug, lubricant reservoirs at the ends of the plug body with which said pistons cooperate, means to raise and lower the plug during rotation, and means to adjust the plug axially in the valve body without rotating the plug.

6. In a lubricated plug valve, a valve body having a main-line passage therethrough and a valve seat intercepting the main-line passage, said valve seat being tapered throughout its major portion but provided with a cylindrical extension at one end thereof, a rotatable plug having a body located in the seat and having its major portion tapered to fit the major portion of the valve seat and having a cylindrical piston at one end to fit the cylindrical portion of the valve seat, a piston-like extension on the other end of the plug, lubricant reservoirs at the ends of the plug body with which said pistons cooperate to exert pressure on the lubricant, a screw-threaded connection between the plug and the valve body, and means to adjust the screw-threaded connection to vary the vertical position of the plug without rotating it.

EDWARD C. BOSTOCK.

REFERENCES CITED

The following references are of record in the file of this patent:

UNITED STATES PATENTS

| Number | Name | Date |
|---|---|---|
| 845,540 | Ferguson | Feb. 26, 1907 |
| 1,504,219 | Cryer | Aug. 12, 1924 |
| 1,569,252 | Barnes | Jan. 12, 1926 |
| 1,694,404 | Stevens | Dec. 11, 1928 |
| 1,910,947 | Coffman | May 23, 1933 |
| 2,066,250 | Clark | Dec. 29, 1936 |
| 2,169,525 | Goldberg | Aug. 15, 1939 |
| 2,412,529 | Mueller | Dec. 10, 1946 |

FOREIGN PATENTS

| Number | Country | Date |
|---|---|---|
| 60,557 | Germany | of 1892 |
| 251,376 | Great Britain | of 1926 |